June 23, 1942. T. C. GRAHAM 2,287,097
MICROMETER GAUGE FOR INTERNAL THREADS
Filed Jan. 9, 1940
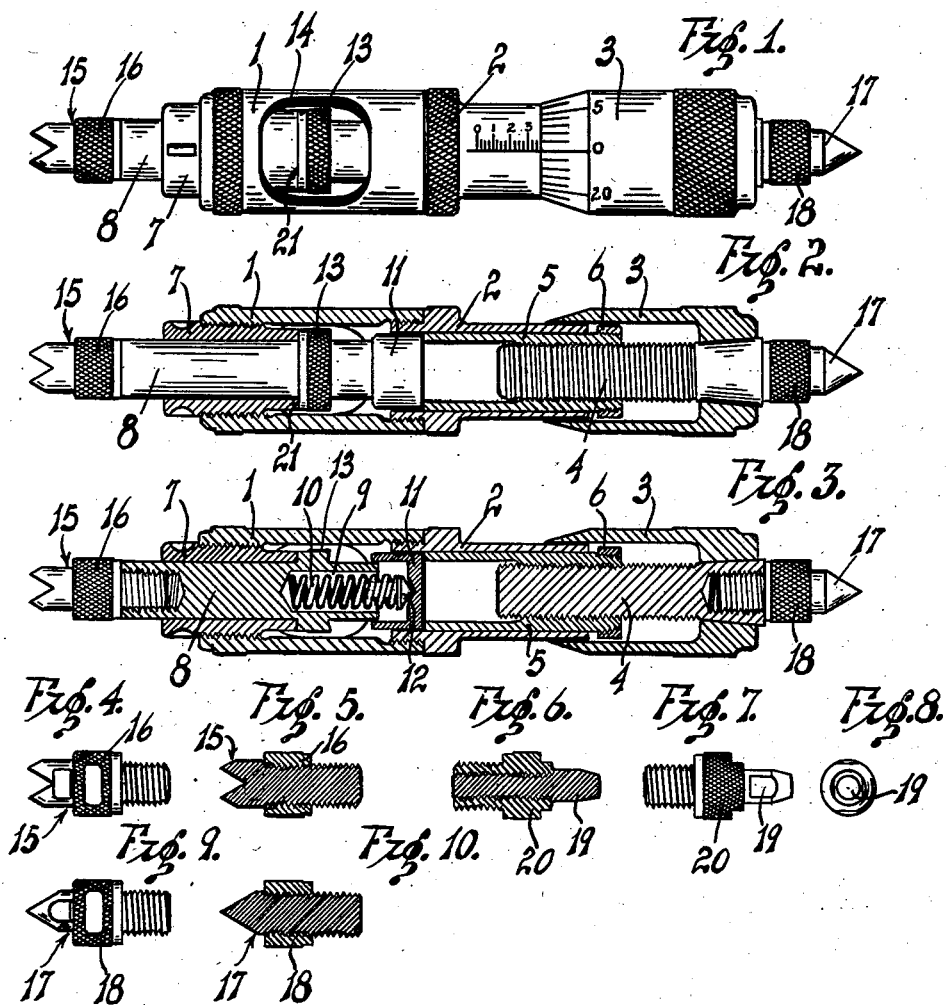
INVENTOR
TOM C. GRAHAM.

Patented June 23, 1942

2,287,097

UNITED STATES PATENT OFFICE 2,287,097

MICROMETER GAUGE FOR INTERNAL THREADS

Tom C. Graham, Long Beach, Calif.

Application January 9, 1940, Serial No. 313,050

2 Claims. (Cl. 33—199)

This invention relates to a micrometer gauge for internal threads, which is adapted to be set to a definite thread pitch diameter and establish a gauge for a certain standard thread pitch size, and then can be inserted into a threaded part, or be removed, without requiring a change of adjustment.

A feature of my invention resides in the novel micrometer gauge of the character stated, which will measure an internal thread and then that thread size can be transferred to a part being threaded in a lathe to duplicate the original thread, and without requiring a change in the original adjustment of the gauge.

Another feature of my invention resides in the ability of my micrometer gauge to gauge threads quickly which are being cut in a lathe, and without requiring that the tool be moved out of the way, as is necessary when using gauges now on the market.

An object of my invention is to provide a novel micrometer gauge of the character stated, which when set to a certain pitch diameter, is provided with a quick means to approximate how much the threads lack of being to proper size.

An advantage of my invention is that my micrometer gauge can be set to gauge threads a definite amount over or under size.

Another object of my invention is that my micrometer can very accurately measure between surfaces, when fitted with suitable tips, due to the spaceable friction surfaces included in the micrometer construction—that is, if the free end of the micrometer turns with little resistance, this indicates to the workman that the micrometer is set a fraction of an inch too long. This object and advantage is particularly valuable when the tool is used as a height gauge or in locating the settings of a machine, table or head.

Another feature of my invention resides in the ability of the micrometer gauge to be set to the size of a finished bore, and contracted and slipped into place after a trial cut has been made, and will show approximately how much more is to be cut to bring the bore to size without changing the adjustment of the micrometer. The workman notes the space of the gap between the spindle and the adjusting sleeve.

Other objects, advantages and features of invention may appear from the accompanying drawing, the subjoined detailed description, and the appended claims.

In the drawing

Figure 1 is a side elevation of my micrometer gauge.

Figure 2 is a longitudinal, sectional view of my gauge, with the sliding spindle and micrometer screw shown in elevation.

Figure 3 is a longitudinal, sectional view of my micrometer.

Figure 4 is a side elevation of a tip for use in measuring threads, which screws into one end of the micrometer.

Figure 5 is a longitudinal, sectional view of the same.

Figure 6 is a longitudinal, sectional vew of another type of threaded tip for use in measuring between plain surfaces.

Figure 7 is a side elevation of the same.

Figure 8 is an end view of the same.

Figure 9 is a side elevation of another type of tip for use in measuring threads.

Figure 10 is a longitudinal, sectional view of the same.

Referring more particularly to the drawing, the numeral 1 indicates the micrometer frame, which is tubular in form. The frame 1 screws onto one end of a barrel 2. The threaded joint between the barrel and the frame is relatively tight, and these two parts shoulder against each other to prevent any longitudinal movement between them. A thimble 3 fits closely over the barrel 2, and is adapted to slide longitudinally along the barrel as adjustment is made. A micrometer screw 4 is non-rotatably mounted in the thimble 3—for example by pressing the micrometer screw into the thimble, or by other suitable means. The micrometer screw threads into a tubular screw nut 5, and the threaded connection between the screw and the screw nut is very accurate due to the fact that the micrometer adjustment is made at this point. By rotating the thimble 3, the micrometer screw 4 can be moved longitudinally to adjust the micrometer, all of which is usual and well-known. The usual adjusting nut 6 screws onto the outer end of the micrometer screw nut 5, all of which is usual and well-known in the art.

An adjusting sleeve 7 screws into the outer end of the frame 1, and this threaded connection is relatively close so that the sleeve will not easily rotate in the frame but requires a tool, spanner or the like to operate the same. The purpose of this adjusting sleeve will be further described.

A sliding spindle 8 is accurately fitted within the sleeve 7 and has a limited longitudinal movement within the sleeve. The inner end of the spindle 8 is counter-bored, as shown at 9, to receive a coil spring 10. The inner end of the spindle 8 fits within a cup 11, which bears against the inner end of the micrometer screw nut 5. The cup 11 also fits accurately within the inner end of the barrel 2, substantially as shown in Figure 3. The spring 10 extends into the cup 11, and a spring pivot 12 is fitted on the inner end of the spring and bears against the cup to permit free rotation of the sliding spindle 8, under conditions where the spring 10 is compressed and the sliding spindle is pushed inwardly into the cup.

A knurled ring 13 is provided on the spindle 8, and is operable through windows 14 in the frame 1 when the operator wishes to accurately feel whether the micrometer has been properly adjusted. A tip 15 screws into the outer end of the sliding spindle 8, and this tip is preferably bifurcated so as to fit over internal threads. The tip 15 also includes an outer adjusting sleeve 16, which is tightly threaded onto the tip, and shoulders against the end of the spindle 8. By threading this sleeve along the tip, it is possible to adjust the over-all length of the tip. A pointed tip 17 screws into the outer end of the micrometer screw 4. This tip is preferably pointed, and also includes an adjusting sleeve 18, which is tightly threaded onto the outside of the tip.

When the micrometer is to be used for other purposes, a blunt tip 19, as shown in Figures 6 to 8 inclusive, may be mounted on either or both of the sliding spindle 8 and the micrometer screw 4. This tip is made up of two members 19 and 20, which are tightly threaded together to allow for initial adjustment in manufacture, and subsequent adjustment to compensate for wear.

In operation, when measuring internal threads, the micrometer is provided with suitable tips, substantially as shown in Figures 1 to 3 inclusive. The workman then adjusts the length of the micrometer to approximately the entire length. Without altering this adjustment, the micrometer is inserted into the threaded pipe, collar or the like, this being accomplished due to the sliding spindle 8, which moves inwardly to compress the spring 10, and then springs outwardly against the threads due to the pressure of the spring 10. It is to be noted that one surface of the knurled ring 13 bears against the inner surface of the adjusting sleeve 7, and if the micrometer is set too long, the workman can readily observe a space between the sleeve and the ring, as shown at 21, and also the workman can readily spin the whole micrometer body, pivoting on the pointed tip to feel the adjustment. When the micrometer is properly adjusted, the friction between the knurled ring and the end of the sleeve 7 will indicate to the workman that the proper adjustment has been reached. Also, the space between the knurled ring and the sleeve 7, when observed, by the workman, will indicate roughly how much the micrometer is out of adjustment, or the amount of additional planing or cutting which must be made to bring the finished product to proper size.

Having described my invention, I claim:

1. A micrometer gauge comprising a frame, a micrometer screw mounted on one end of the frame, an adjusting sleeve threaded into the other end of the frame, a spindle rotatably and slidably mounted in the adjusting sleeve, spring means bearing against the inner end of the spindle whereby the spindle is yieldably pressed outwardly, said spring means including a coil spring, said spindle having a counter-bore to receive the spring, a cup mounted in the frame, said spring extending into the cup and a tip on the end of the spring and bearing against the cup.

2. A micrometer gauge comprising a frame, a micrometer screw mounted on one end of the frame, an adjusting sleeve threaded into the other end of the frame, a spindle rotatably and slidably mounted in the adjusting sleeve, spring means bearing against the inner end of the spindle whereby the spindle is yieldably pressed outwardly, said spring means including a coil spring, said spindle having a counter-bore to receive the spring, a cup mounted in the frame, said spring extending into the cup and a tip on the end of the spring and bearing against the cup, an external ring on the spindle, said ring bearing against the inner end of the adjusting sleeve in normal position of the micrometer.

TOM C. GRAHAM.